US012688665B2

(12) United States Patent
Hou et al.

(10) Patent No.: US 12,688,665 B2
(45) Date of Patent: Jul. 21, 2026

(54) IMAGE DATA DISTRIBUTION METHOD AND APPARATUS, AND TERMINAL AND MEDIUM

(71) Applicant: JINGDONG TECHNOLOGY HOLDING CO., LTD., Beijing (CN)

(72) Inventors: Yongming Hou, Beijing (CN); Guangzhen Sui, Beijing (CN)

(73) Assignee: JINGDONG TECHNOLOGY HOLDING CO., LTD., Beijing (CN)

( * ) Notice: Subject to any disclaimer, the term of this patent is extended or adjusted under 35 U.S.C. 154(b) by 464 days.

(21) Appl. No.: 18/257,570

(22) PCT Filed: Apr. 8, 2022

(86) PCT No.: PCT/CN2022/085820
§ 371 (c)(1),
(2) Date: Jun. 14, 2023

(87) PCT Pub. No.: WO2022/222770
PCT Pub. Date: Oct. 27, 2022

(65) Prior Publication Data
US 2024/0119694 A1 Apr. 11, 2024

(30) Foreign Application Priority Data

Apr. 20, 2021 (CN) .......................... 202110424483.8

(51) Int. Cl.
*G06T 11/10* (2026.01)
*G06V 10/22* (2022.01)
*G06V 40/16* (2022.01)

(52) U.S. Cl.
CPC .............. *G06V 10/22* (2022.01); *G06T 11/10* (2026.01); *G06V 40/16* (2022.01)

(58) Field of Classification Search
CPC .................. G06T 11/001; G09G 5/001; G06F 2212/1041; G06V 10/23; G06V 40/16; G06V 10/22; H04N 21/4431
See application file for complete search history.

(56) References Cited

U.S. PATENT DOCUMENTS

| | | |
|---|---|---|
| 11,593,908 B2 | 2/2023 | Peng |
| 2004/0190062 A1 | 9/2004 | McIntyre |

(Continued)

FOREIGN PATENT DOCUMENTS

| | | |
|---|---|---|
| CN | 101833520 A | 9/2010 |
| CN | 106230841 A | 12/2016 |

(Continued)

OTHER PUBLICATIONS

"First Office Action and English language translation", CN Application No. 202110424483.8, Aug. 10, 2022, 20 pp.
"International Search Report and English language translation", International Application No. PCT/CN2022/085820, May 30, 2022, 6 pp.
"Notice of Second Examination Opinion and English language translation", CN Application No. 202110424483.8, Mar. 8, 2023, 29 pp.

(Continued)

*Primary Examiner* — Antonio A Caschera
(74) *Attorney, Agent, or Firm* — Myers Bigel, P.A.

(57) ABSTRACT

The method includes generating a surface texture instance for processing information acquired by an image acquisition means; generating an image acquisition means instance corresponding to the image acquisition means; binding the image acquisition means instance with the surface texture instance; processing the information acquired by the image acquisition means, generating image data by the surface texture instance; and acquiring the image data in an interface callback manner by using the image acquisition means instance, and distributing the image data to an application and/or a page instance.

17 Claims, 5 Drawing Sheets

(56)  References Cited

U.S. PATENT DOCUMENTS

| | | |
|---|---|---|
| 2014/0337221 A1 | 11/2014 | Hoyos |
| 2018/0225846 A1* | 8/2018 | Kim .......................... G06T 1/60 |

FOREIGN PATENT DOCUMENTS

| | | |
|---|---|---|
| CN | 106791356 A | 5/2017 |
| CN | 108363742 A | 8/2018 |
| CN | 108364324 A | 8/2018 |
| CN | 109889877 A | 6/2019 |
| CN | 111614906 A | 9/2020 |
| CN | 112579322 A | 3/2021 |
| CN | 113095255 A | 7/2021 |
| JP | 2019109919 A | 7/2019 |
| JP | 2020064664 A | 4/2020 |

OTHER PUBLICATIONS

"Notice of Third Examination Opinion and English language translation", CN Application No. 202110424483.8, Jul. 5, 2023, 26 pp.

INTERNET , "Android surface Texture between two processes (and non-official English translation)", retrieved from https://www.icode9.com/content-3-197801.html, May 19, 2019, 4 pp.

He, Liming, "Android Telephony Architecture Analysis and Implementation", Jilin University Press, Dec. 31, 2019, 17 pp.

Search Report and Written Opinion, SG Application No. 11202304607R, Sep. 23, 2025, 10 pp.

"Office Action with Reasons for Refusal" and English language translation, JP Application No. 2023-536168, Dec. 9, 2025, 10 pp.

* cited by examiner image data distribution
module 55 interface callback
unit 551 callback
distribution unit
552

IMAGE DATA DISTRIBUTION METHOD AND APPARATUS, AND TERMINAL AND MEDIUM

CROSS-REFERENCE TO RELATED APPLICATIONS and the present application is a U.S. National Stage Application under 35 U.S.C. § 371 of International Application No. PCT/CN2022/085820, filed Apr. 8, 2022, which itself claims the priority to Chinese Patent Application No. 202110424483.8, filed on Apr. 20, 2021, the disclosures of both of which are hereby incorporated herein by reference in their entireties.

TECHNICAL FIELD

This invention relates to the field of computer technologies, and in particular, to an image data distribution method and apparatus, a terminal and a storage medium.

BACKGROUND

The number of cameras of intelligent hardware (including an intelligent entrance guard, an intelligent sound box, etc.) can be one or more. The initiation of a traditional camera function must have a Surface carrier for preview, and one camera can only support one background application at one same time.

SUMMARY

According to a first aspect of the present disclosure, there is provided an image data distribution method applied to a terminal, comprising: generating a surface texture instance for processing information acquired by an image acquisition means; generating an image acquisition means instance corresponding to the image acquisition means; binding the image acquisition means instance with the surface texture instance; generating image data, by the surface texture instance processing the information acquired by the image acquisition means; and acquiring the image data in an interface callback manner by using the image acquisition means instance, and distributing the image data to an application and/or a page instance.

In some embodiments, the acquiring the image data in an interface callback manner by using the image acquisition means instance comprises: creating an image acquisition callback interface in the image acquisition means instance, wherein the image acquisition callback interface is used for realizing callback transmission of the image data and providing an image data transmission method; providing the image acquisition callback interface to the surface texture instance; and by using the image acquisition means instance, receiving the image data sent by the surface texture instance by performing callback on the image data transmission method.

In some embodiments, the distributing the image data to an application and/or a page instance comprises: judging whether an image data distribution interface of the application and/or the page instance is registered in the image acquisition means instance, wherein the image data distribution interface is used for realizing callback distribution of the image data and providing an image distribution method; and distributing the image data to the corresponding application and/or the page instance, by the image acquisition means instance performing callback on the image distribution method, if the image data distribution interface of the application and/or the page instance is registered in the image acquisition means instance.

In some embodiments, the application and/or the page instance receives the image data distributed by the image acquisition means instance by performing callback on the image distribution method, and processing is performed based on the image data.

In some embodiments, the application comprises: a video preview application, a face recognition application, a video recording application, and a quick response (QR) code scanning application; and the performing processing based on the image data comprises: the video preview application performing video interface rendering based on the image data; the face recognition application inputting the image data into a face recognition software development kit (SDK) for processing, and performing face recognition processing based on a processing result; the video recording application performing video recording based on the image data; and the QR code scanning application performing QR code identification processing based on the image data.

In some embodiments, the generating a surface texture instance for processing information acquired by an image acquisition means comprises: creating a texture instance by using OpenGL ES; and generating the surface texture instance by using the texture instance.

In some embodiments, the generating an image acquisition means instance corresponding to the image acquisition means comprises: judging whether the image acquisition means is started; and generating the image acquisition means instance, if it is determined that the image acquisition means is started.

In some embodiments, the binding the image acquisition means instance with the surface texture instance comprises: judging whether the surface texture instance is generated; providing the surface texture instance to the image acquisition means instance, if it is determined that the surface texture instance is generated, wherein the image acquisition means instance, by taking the surface texture instance as a call parameter, realizes the binding with the surface texture instance.

In some embodiments, the image acquisition means comprises: a camera; and the image data comprises: video streaming data.

According to a third aspect of the present disclosure, there is provided an image data distribution apparatus applied to a terminal, comprising: a processor; and a memory coupled to the processor, storing program instructions which, when executed by the processor, cause the processor to: generate a surface texture instance for processing information acquired by an image acquisition means; generate an image acquisition means instance corresponding to the image acquisition means; bind the image acquisition means instance with the surface texture instance; generate image data, by the surface texture instance processing the information acquired by the image acquisition means; and acquire the image data in an interface callback manner by using the image acquisition means instance, and distribute the image data to an application and/or a page instance.

In some embodiments, the acquiring the image data in an interface callback manner by using the image acquisition means instance comprises: creating an image acquisition callback interface in the image acquisition means instance, wherein the image acquisition callback interface is used for realizing callback transmission of the image data and providing an image data transmission method; providing the image acquisition callback interface to the surface texture instance; and receiving the image data sent by the surface texture instance by performing callback on the image data transmission method, by using the image acquisition means instance.

In some embodiments, the distributing the image data to an application and/or a page instance comprises: judging whether an image data distribution interface of the application and/or the page instance is registered in the image acquisition means instance, wherein the image data distribution interface is used for realizing callback distribution of the image data and providing an image distribution method; and distributing the image data to the corresponding application and/or the page instance, by the image acquisition means instance performing callback on the image distribution method, if the image data distribution interface of the application and/or the page instance is registered in the image acquisition means instance.

In some embodiments, the generating a surface texture instance for processing information acquired by an image acquisition means comprises: creating a texture instance by using OpenGL ES; and generating the surface texture instance by using the texture instance.

In some embodiments, the generating an image acquisition means instance corresponding to the image acquisition means comprises: judging whether the image acquisition means is started; and generating the image acquisition means instance, if it is determined that the image acquisition means is started.

In some embodiments, the binding the image acquisition means instance with the surface texture instance comprises: judging whether the surface texture instance is generated; providing the surface texture instance to the image acquisition means instance, if it is determined that the surface texture instance is generated, wherein the image acquisition means instance, by taking the surface texture instance as a call parameter, realizes the binding with the surface texture instance.

According to a fourth aspect of the present disclosure, there is provided a terminal, comprising: the image data distribution apparatus as described above.

According to a fifth aspect of the present disclosure, there is provided a non-transitory computer-readable storage medium having thereon stored computer instructions which, when executed by one or more processors, cause the one or more processors to: generate a surface texture instance for processing information acquired by an image acquisition means; generate an image acquisition means instance corresponding to the image acquisition means; bind the image acquisition means instance with the surface texture instance; generate image data, by the surface texture instance processing the information acquired by the image acquisition means; and acquire the image data in an interface callback manner by using the image acquisition means instance, and distribute the image data to an application and/or a page instance.

In some embodiments, the acquiring the image data in an interface callback manner by using the image acquisition means instance comprises: creating an image acquisition callback interface in the image acquisition means instance, wherein the image acquisition callback interface is used for realizing callback transmission of the image data and providing an image data transmission method; providing the image acquisition callback interface to the surface texture instance; and receiving the image data sent by the surface texture instance by performing callback on the image data transmission method, by using the image acquisition means instance.

In some embodiments, the distributing the image data to an application and/or a page instance comprises: judging whether an image data distribution interface of the application and/or the page instance is registered in the image acquisition means instance, wherein the image data distribution interface is used for realizing callback distribution of the image data and providing an image distribution method; and distributing the image data to the corresponding application and/or the page instance, by the image acquisition means instance performing callback on the image distribution method, if the image data distribution interface of the application and/or the page instance is registered in the image acquisition means instance.

In some embodiments, the generating a surface texture instance for processing information acquired by an image acquisition means comprises: creating a texture instance by using OpenGL ES; and generating the surface texture instance by using the texture instance.

BRIEF DESCRIPTION OF THE DRAWINGS

In order to more clearly illustrate the embodiments of the present disclosure or technical solutions in the related art, the drawings that need to be used in the description of the embodiments or the related art will be briefly described below. It is obvious that the drawings in the description below are merely some embodiments of the present disclosure, and for one of ordinary skill in the art, other drawings can also be obtained according to the drawings without paying creative efforts.

DETAILED DESCRIPTION

A more comprehensive description of the present disclosure is made in the following with reference to the accompanying drawings, in which exemplary embodiments of the present disclosure are illustrated. The technical solutions in the embodiments of the present disclosure will be described clearly and completely with reference to the drawings in the embodiments of the present disclosure, and it is obvious that the embodiments described are merely some embodiments of the present disclosure, rather than all embodiments. Based on the embodiments in the present disclosure, all other embodiments, which are obtained by one of ordinary skill in the art without making creative efforts, shall fall within the protection scope of the present disclosure. The technical solutions of the present disclosure are described in various aspects below in conjunction with the drawings and the embodiments.

In the related art known by the inventors, in an actual application of intelligent hardware, there may be a plurality of applications simultaneously operating in a background, and they all need to use a camera. One camera cannot support the plurality of applications at one same time, then conflicts and anomalies of the plurality of applications possibly will occur. Since the number of cameras of the intelligent hardware is uncertain, and the applications working simultaneously are also uncertain, the plurality of applications may not be supported due to insufficient cameras, and on the other hand, if the intelligent terminal is provided with too many cameras, it will also cause waste of hardware.

In view of this, one technical problem to be solved by the present invention is to provide an image data distribution method and apparatus, a terminal, and a storage medium, capable of distributing image information acquired by a camera to multiple webpage instances and multiple applications, so that multiple functions are simultaneously supported; in addition, the invention can overcome the disadvantage in the prior art that one camera can only support one function at one same time, and therefore can reduce hardware cost and improve use experience of a user.

Figure 1:
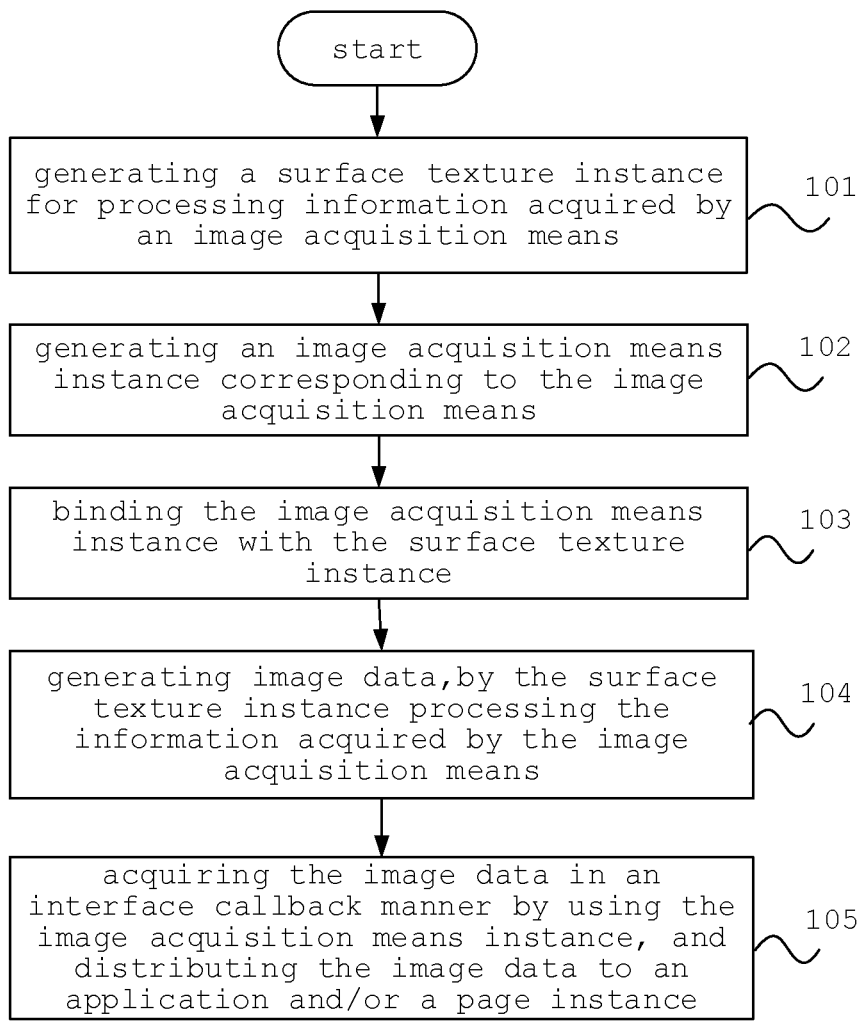
FIG. 1 is a schematic flow diagram of some embodiments according to an image data distribution method of the present disclosure.

FIG. 1 is a schematic flow diagram of one embodiment according to an image data distribution method of the present disclosure, which is applied to a terminal, as shown in FIG. 1:

step 101, generating a surface texture instance for processing information acquired by an image acquisition means.

In one embodiment, the terminal can be intelligent hardware such as an intelligent entrance guard, an intelligent sound box, and the terminal can also be a mobile phone, or the like. The image acquisition means can be a video camera, a camera, or the like, that is mounted on the terminal, through which image information is acquired. The surface texture instance can process the image information acquired through the video camera, the camera, or the like, to generate video streaming data and the like.

Step 102, generating an image acquisition means instance corresponding to the image acquisition means.

Step 103, binding the image acquisition means instance with the surface texture instance.

Step 104, by the surface texture instance processing the information acquired by the image acquisition means, generating image data. The image data includes video streaming data and the like.

Step 105, acquiring the image data in an interface callback manner by using the image acquisition means instance, and distributing the image data to an application and/or a page instance.

Based on the image data distribution method of the present disclosure, in the case where the video streaming data is acquired by one or more cameras, the video streaming data is distributed to a plurality of webpage instances, a plurality of applications, and the like. For example, a terminal is mounted with one camera, image information acquired by the camera is distributed to multiple webpage instances and multiple applications, to simultaneously support multiple functions, so that "one camera for multiple applications" is realized; in addition, the method can overcome the disadvantage in the prior art that one camera can only support one function at one same time, so that hardware cost can be reduced.

In some embodiments, a variety of approaches can be adopted to generate the surface texture instance for processing the information acquired by the image acquisition means. A texture instance is created using OpenGL ES(OpenGL for Embedded Systems), and a surface texture instance is generated by using the texture instance. OpenGL ES (OpenGL for Embedded System) is a subset of OpenGL three-dimensional graphics API, and is designed for embedded devices such as a mobile phone, PDA, and game console.

For example, a surface texture instance is created as follows:

// create an opgl texture
　　int mInputTexture=OpenGLUtils.createOESTexture( );
　　// create surfeTexture using the generated texture instance,
　　　　i.e., set surfaceTexture that receives preview data for a camera
　　SurfaceTexture mSurfaceTexture=new SurfaceTexture (mInputTexture).

The surface texture instance generated by using the texture instance is mSurfaceTexture, which is bound with the camera in place of SurfaceView, to acquire the data acquired by the camera and process the data. The surface texture instance can process the data acquired by the camera by using an existing method.

A variety of approaches can be adopted to generate the image acquisition means instance corresponding to the image acquisition means. It is judged whether the image acquisition means is started, and if it is determined that the image acquisition means is started, the image acquisition means instance is generated. For example, an image acquisition means instance is created based on a class corresponding to a camera, and the image acquisition means instance can acquire data information acquired by a specific camera. Creating the image acquisition means instance is: Camera camera=Camera.open(cameraId), where camera is an image acquisition means instance.

There may be a variety of approaches to bind the image acquisition means instance with the surface texture instance. It is judged whether the surface texture instance is generated, and if it is determined that the surface texture instance is generated, the surface texture instance is provided to the image acquisition means instance; and the image acquisition means instance, by taking the surface texture instance as a call parameter, is bound with the surface texture instance. For example, by means of camera.setPreviewTexture(mSurfaceTexture), the image acquisition means instance is bound with the surface texture instance, wherein the image acquisition means instance, camera, takes the surface texture instance mSurfaceTexture as a call parameter, so that binding camera with mSurfaceTexture can be realized.

Figure 2:
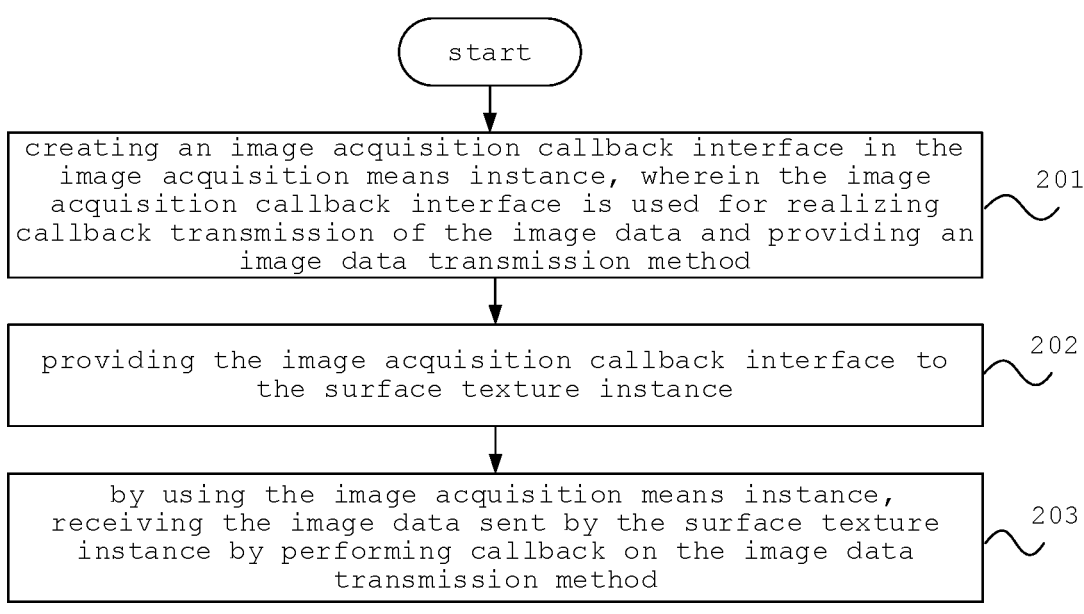
FIG. 2 is a schematic flow diagram of acquiring image data of some embodiments according to an image data distribution method of the present disclosure.

FIG. 2 is a schematic flow diagram of acquiring image data of some embodiments according to an image data distribution method of the present disclosure, as shown in FIG. 2:

step 201, creating an image acquisition callback interface in the image acquisition means instance, wherein the image acquisition callback interface is used for realizing callback transmission of the image data and providing an image data transmission method.

Step 202, providing the image acquisition callback interface to the surface texture instance.

Step 203, by using the image acquisition means instance, receiving the image data sent by the surface texture instance by performing callback on the image data transmission method.

In some embodiments, interface callback refers to a method that a reference to an object created by using a class of a certain interface can be assigned to an interface variable declared by that interface, so that the interface variable can call the interface implemented by the class. A purpose of the callback is to transmit data and keep a synchronous update of the data. The interface callback method adopted in the present disclosure can be existing multiple interface callback methods, such as a JAVA interface callback method.

The image data transmission method can be a callback method, which is a method of calling by a method pointer. If a pointer (address, reference) of the image data transmission method is, through a formal parameter, transmitted into a certain method of the surface texture instance, the image data transmission method can be called when the surface texture instance calls the pointer transmitted into the method.

In some embodiments, the surface texture instance (SurfaceTexture) is created in a background through OpenGL ES, wherein SurfaceTexture can be an existing class or instance. After the camera is opened, the surface texture instance (SurfaceTexture) is bound with the image acquisition means instance (Camera), and starts to preview and process the information acquired by the camera. The image acquisition callback interface Camera.PreviewCallback is implemented and created in the image acquisition means instance, and the image data transmission method is provided in Camera.PreviewCallback.

The image acquisition callback interface Camera.PreviewCallback is provided to the surface texture instance (SurfacetTexture) (this Camera.PreviewCallback is registered in the surface texture instance SurfacetTexture, the image data transmission method is provided in Camera.PreviewCallback, and a reference to the image data transmission method is transmitted into the surface texture instance).

The surface texture instance (SurfaceTexture), when determining that there is the image data, performs callback on the image data transmission method provided in Camera.PreviewCallback. The image acquisition means instance (Camera) receives the image data sent by the surface texture instance (SurfaceTexture) by performing callback on the image data transmission method provided in Camera.PreviewCallback.

Figure 3:
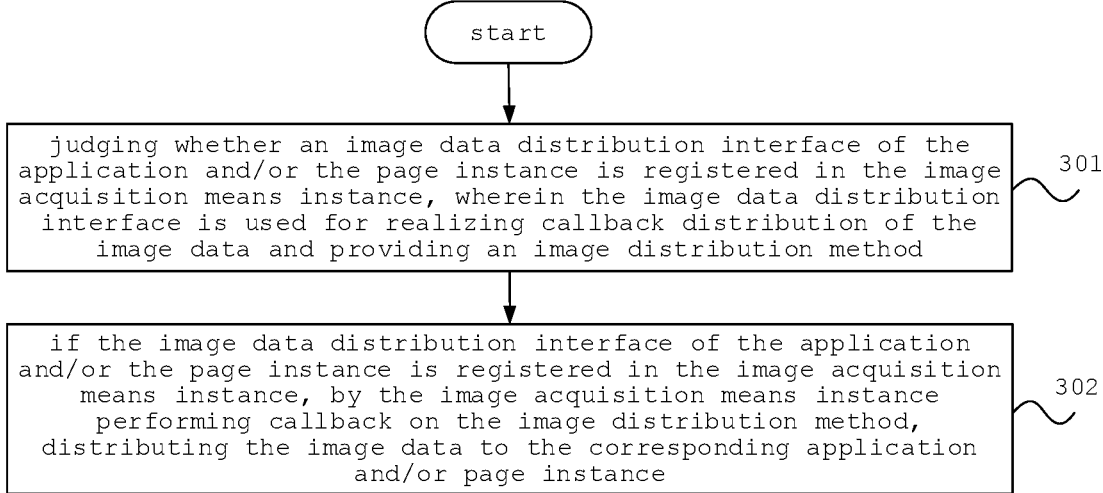
FIG. 3 is a schematic flow diagram of image data distribution of some embodiments according to an image data distribution method of the present disclosure.

FIG. 3 is a schematic flow diagram of image data distribution of some embodiments according to an image data distribution method of the present disclosure, as shown in FIG. 3:

step 301, judging whether an image data distribution interface of the application and/or the page instance is registered in the image acquisition means instance, wherein the image data distribution interface is used for realizing callback distribution of the image data and providing an image distribution method.

In some embodiments, the application and/or the page instance defines and creates the image data distribution interface, which contains an image distribution method. To realize the image distribution method, the application and/or the page instance register(s) the image data distribution interface and the image distribution method in the image acquisition means instance, and transmit(s) the image data distribution interface and a reference or address of the image distribution method to the image acquisition means instance. The registration of the image data distribution interface and the transmission of the instance or address can be performed by using an existing method.

The image acquisition means instance, under a triggering condition, calls back the registered image data distribution interface and image distribution method of the application and/or the page instance. The triggering condition can be that the image acquisition means instance receives the image data sent by the surface texture instance by performing callback on the image data transmission method.

A customized interface callback method is registered in different function pages or places needing streaming data, when data called back by Camera is received, it is checked whether a registered interface exists, and if the registered interface exists, the data is fed back to the registered pages through the interface.

Step 302, if the image data distribution interface of the application and/or the page instance is registered in the image acquisition means instance, by the image acquisition means instance performing callback on the image distribution method, distributing the image data to the corresponding application and/or page instance.

In some embodiments, the application includes a video preview application, a face recognition application, a video recording application, a quick response (QR) code scanning application, and the like; and the application and the page instance receive the image data distributed by the image acquisition means instance by performing callback on the image data distribution method, and performs processing based on the image data. For example, the video preview application performs video interface rendering based on the image data; the face recognition application inputs the image data into a face recognition software development kit (SDK) for processing, and performs face recognition processing based on the processing result; the video recording application performs video recording based on the image data; and the QR code scanning application performs QR code recognition processing based on the image data.

Figure 4:
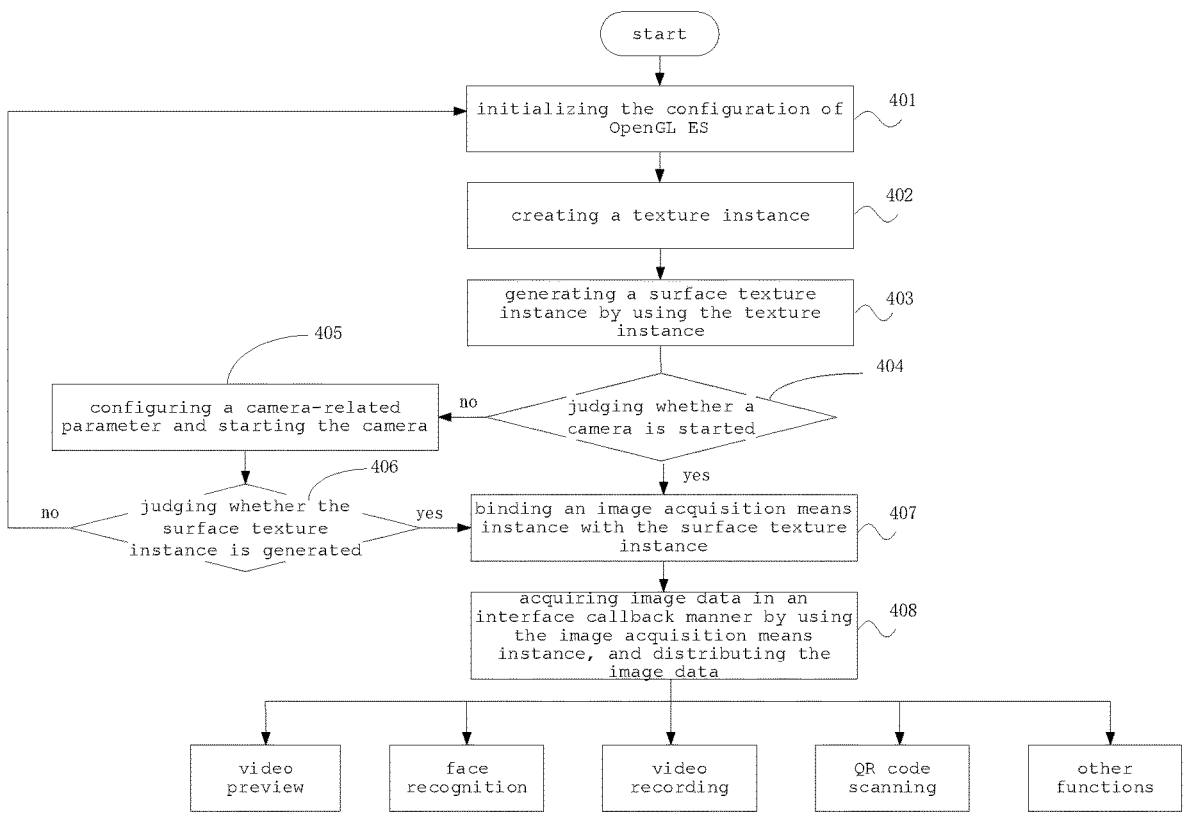
FIG. 4 is a schematic flow diagram of other embodiments according to an image data distribution method of the present disclosure.

FIG. 4 is a schematic flow diagram of other embodiments according to an image data distribution method of the present disclosure, as shown in FIG. 4:

Step 401, initializing the configuration of OpenGL ES.

Step 402, creating a texture instance.

Step 403, generating a surface texture instance by using the texture instance.

Step 404, judging whether a camera is started, and if so, entering step 407, and if not, entering step 405.

Step 405, configuring a camera-related parameter and starting the camera.

Step 406, judging whether the surface texture instance is generated, if so, entering the step 407, and if not, entering the step 401.

Step 407, binding an image acquisition means instance with the surface texture instance.

Step 408, acquiring image data in an interface callback manner by using the image acquisition means instance, and distributing the image data.

A system background such as android, by binding SurfaceTexture with Camera, acquires video streaming data, and the video streaming data exists all the time; when one or more functions of different pages need the video streaming data for a certain function, the video streaming data is, through a registered interface, returned by adopting an interface callback mechanism, so that multiple functions can be simultaneously performed.

For a video preview function: an android system component surfaceView receives the video streaming data distributed by the image acquisition means instance, and performs video interface rendering. For a face recognition function: the video streaming data distributed by the image acquisition means is transmitted to different face recognition SDKs, and after internal processing, the SDKs compare the processing result with already entered face information to realize the face recognition function. For a video recording function: by using an instance of a MediaCodec class provided by android, the video streaming data distributed by the image acquisition means is received for video recording.

Figures 5, 6:
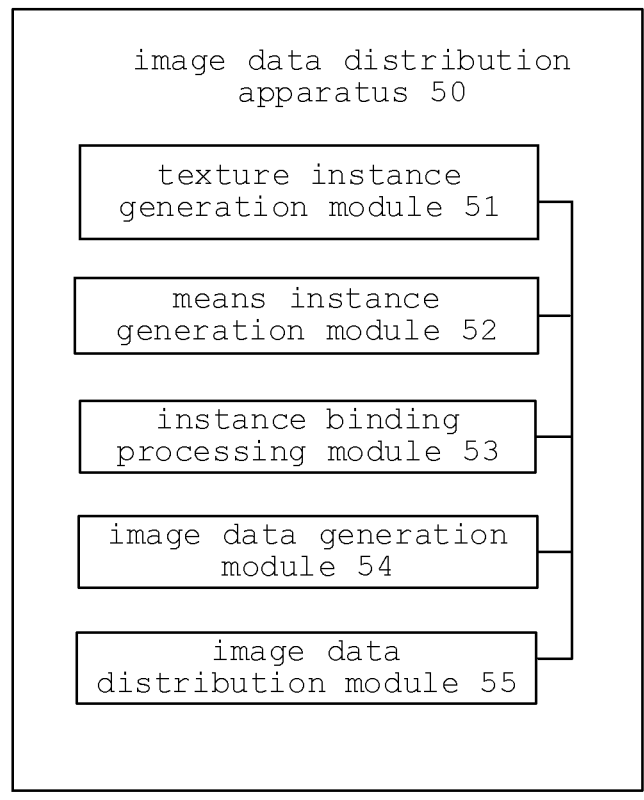
FIG. 5 is a schematic block diagram of some embodiments according to an image data distribution apparatus of the present disclosure.
FIG. 6 is a schematic block diagram of an image data distribution module in some embodiments according to an image data distribution apparatus of the present disclosure.

In some embodiments, as shown in FIG. 5, the present disclosure provides an image data distribution apparatus 50 applied to a terminal, comprising: a texture instance generation module 51, a means instance generation module 52, an instance binding processing module 53, an image data generation module 54, and an image data distribution module 55. The texture instance generation module 51 generates a surface texture instance for processing information acquired by an image acquisition means. The means instance generation module 52 generates an image acquisition means instance corresponding to the image acquisition means.

The instance binding processing module 53 binds the image acquisition means instance with the surface texture instance. The image data generation module 54 generates image data, by the surface texture instance processing the information acquired by the image acquisition mean. The image data distribution module 55 acquires the image data in an interface callback manner by using the image acquisition means instance, and distributes the image data to an application and/or a page instance.

In some embodiments, the texture instance generation module 51 creates a texture instance by using OpenGL ES, and generates a surface texture instance by using the texture instance. The means instance generation module 52 judges whether the image acquisition means is started, and if it is determined that the image acquisition means is started, the means instance generation module 52 generates the image acquisition means instance.

The instance binding processing module 53 judges whether the surface texture instance is generated, and if it is determined that the surface texture instance is generated, the instance binding processing module 53 provides the surface texture instance to the image acquisition means instance, wherein the image acquisition means instance, by taking the surface texture instance as a call parameter, realizes the binding with the surface texture instance.

In some embodiments, as shown in FIG. 6, the image data distribution module 55 comprises: an interface callback unit 551 and a callback distribution unit 552. The interface callback unit 551 creates an image acquisition callback interface in the image acquisition means instance, wherein the image acquisition callback interface is used for realizing callback transmission of the image data and providing an image data transmission method.

The interface callback unit 551 provides the image acquisition callback interface to the surface texture instance, and by using the image acquisition means instance, receives the image data sent by the surface texture instance by performing callback on the image data transmission method.

The callback distribution unit 552 judges whether an image data distribution interface of the application and/or the page instance is registered in the image acquisition means instance, wherein the image data distribution interface is used for realizing callback distribution of the image data and providing an image distribution method. If the image data distribution interface of the application and/or the page instance is registered in the image acquisition means instance, the callback distribution unit 552, by the image acquisition means instance performing callback on the image distribution method, distributes the image data to the corresponding application and/or page instance.

Figure 7:
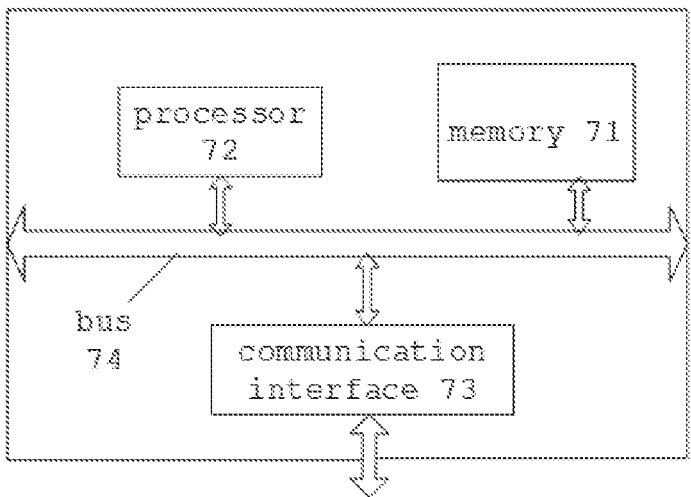
FIG. 7 is a schematic block diagram of other embodiments according to an image data distribution apparatus of the present disclosure.

In some embodiments, the present disclosure provides an image data distribution apparatus applied to a terminal. As shown in FIG. 7, the image data distribution apparatus can comprise a memory 71, a processor 72, a communication interface 73, and a bus 74. The memory 71 is used for storing instructions, the processor 72 is coupled to the memory 71, and the processor 72 is configured to implement, based on the instructions stored in the memory 71, the image data distribution method described above.

The memory 71 can be a high-speed RAM memory, a non-volatile memory (non-volatile memory), or the like, and the memory 71 can also be a memory array. The memory 71 can also be partitioned into blocks, and the blocks can be combined into a virtual volume according to a certain rule. The processor 72 can be a central processing unit CPU, or an application specific integrated circuit (ASIC), or one or more integrated circuits configured to implement the image data distribution method of the present disclosure.

In some embodiments, the present disclosure provides a terminal, comprising the image data distribution apparatus in any of the above embodiments.

In some embodiments, the present disclosure provides a computer-readable storage medium having thereon stored computer instructions which, when executed by a processor, implement the method in any of the above embodiments.

The computer-readable storage medium can take any combination of one or more readable media. The readable medium can be a readable signal medium or a readable storage medium. The readable storage medium can include, for example, but is not limited to, an electronic, magnetic, optical, electromagnetic, infrared, or semiconductor system, apparatus, or device, or a combination of any of the above. More specific examples (not exhaustively listed) of the readable storage medium can include: an electrical connection having one or more wires, a portable diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above.

According to the image data distribution method and apparatus, the terminal, and the storage medium in the above embodiments, the surface texture instance and the image acquisition means instance are generated and bound; the information acquired by the image acquisition means is processed by the surface texture instance, the image data is acquired in a interface callback manner by using the image acquisition means instance, and the image data is distributed to the application and the page instance; the image information acquired by the camera can be distributed to multiple webpage instances and multiple applications, to simultaneously support multiple functions, so that "one camera for multiple applications" is realized; the disadvantage that one camera can only support one function at one same time in the prior art can be overcome, and therefore hardware cost can be reduced and use experience of a user can be improved.

The basic principles of the present disclosure have been described above in conjunction with the specific embodiments, but it should be noted that advantages, benefits, effects, and the like, mentioned in the present disclosure are only examples rather than limitations, and these should not be considered essential to the various embodiments of the present disclosure. It should be appreciated by those skilled in the art that the embodiments of the present disclosure can be provided as a method, system, or computer program product. Accordingly, the present disclosure can take a form of an entire hardware embodiment, an entire software embodiment or an embodiment combining software and hardware aspects. Furthermore, the present disclosure can take a form of a computer program product implemented on one or more computer-available non-transitory storage media (including, but not limited to, a disk memory, CD-ROM, optical memory, and the like) having computer-usable program code embodied therein.

The present disclosure is described with reference to the flow diagrams and/or block diagrams of the method, apparatus (system) and computer program product according to the embodiments of the present disclosure. It should be understood that each flow and/or block of the flow diagrams and/or block diagrams, and a combination of flows and/or blocks in the flow diagrams and/or block diagrams, can be implemented by computer program instructions. These computer program instructions can be provided to a processor of a general-purpose computer, special-purpose computer, embedded processor, or other programmable data processing devices to produce a machine, such that the instructions, which are executed by the processor of the computer or other programmable data processing devices, create means for implementing a function specified in one or more flows of the flow diagrams and/or one or more blocks of the block diagrams.

These computer program instructions can also be stored in a computer-readable memory that can guide a computer or other programmable data processing devices to work in a specific manner, such that the instructions, which are stored in the computer-readable memory, produce an article of manufacture including instruction means which implement a function specified in one or more flows of the flow diagrams and/or one or more blocks of the block diagrams.

The method and system of the present disclosure can be implemented in a number of ways. For example, the method and system of the present disclosure can be implemented through software, hardware, firmware, or any combination of the above. The above order for the steps of the method is for illustration only, and the steps of the method of the present disclosure are not limited to the order specifically described above unless specifically stated otherwise. Furthermore, in some embodiments, the present disclosure can also be implemented as programs recorded in a recording medium, the programs including machine-readable instructions for implementing the method according to the present disclosure. Thus, the present disclosure also covers the recording medium storing the programs for executing the method according to the present disclosure.

The description of the present disclosure has been presented for purposes of illustration and description, and is not exhaustive or limited to the disclosed form of the present disclosure. Many modifications and variations will be apparent to one of ordinary skill in this art. The selection and description of the embodiments are to better explain the principles and practical applications of the present disclosure, and to enable one of ordinary skill in the art to understand the present disclosure and design various embodiments with various modifications suitable for a specific use.

What is claimed is:

1. An image data distribution method applied to a terminal, comprising:
   generating a surface texture instance for processing information acquired by an image acquisition means;
   generating an image acquisition means instance corresponding to the image acquisition means;

binding the image acquisition means instance with the surface texture instance;
   generating image data, by the surface texture instance processing the information acquired by the image acquisition means; and
   acquiring the image data in an interface callback manner by using the image acquisition means instance, and distributing the image data to at least one of an application and a page instance;
   wherein the acquiring the image data in an interface callback manner by using the image acquisition means instance comprises:
   creating an image acquisition callback interface in the image acquisition means instance, wherein the image acquisition callback interface is used for realizing callback transmission of the image data and providing an image data transmission method;
   providing the image acquisition callback interface to the surface texture instance; and
   receiving the image data sent by the surface texture instance by performing callback on the image data transmission method, by using the image acquisition means instance.

2. The image data distribution method according to claim 1, wherein the distributing the image data to at least one of an application and a page instance comprises:
   judging whether an image data distribution interface of at least one of the application and the page instance is registered in the image acquisition means instance, wherein the image data distribution interface is used for realizing callback distribution of the image data and providing an image distribution method; and
   distributing the image data to at least one of the corresponding application and the page instance, by the image acquisition means instance performing callback on the image distribution method, if the image data distribution interface of at least one of the application and the page instance is registered in the image acquisition means instance.

3. The image data distribution method according to claim 2, further comprising:
   at least one of the application and the page instance receiving the image data distributed by the image acquisition means instance by performing callback on the image distribution method, and performing processing based on the image data.

4. The image data distribution method according to claim 3, wherein the application comprises: a video preview application, a face recognition application, a video recording application, and a quick response (QR) code scanning application; and the performing processing based on the image data comprises:
   the video preview application performing video interface rendering based on the image data; the face recognition application inputting the image data into a face recognition software development kit (SDK) for processing, and performing face recognition processing based on a processing result; the video recording application performing video recording based on the image data; and the QR code scanning application performing QR code identification processing based on the image data.

5. The image data distribution method according to claim 1, wherein the generating a surface texture instance for processing information acquired by an image acquisition means comprises:
   creating a texture instance by using OpenGL ES; and
   generating the surface texture instance by using the texture instance.

6. The image data distribution method according to claim 1, wherein the generating an image acquisition means instance corresponding to the image acquisition means comprises:

judging whether the image acquisition means is started; and generating the image acquisition means instance, if it is determined that the image acquisition means is started.

7. The image data distribution method according to claim 1, wherein the binding the image acquisition means instance with the surface texture instance comprises:

judging whether the surface texture instance is generated;

providing the surface texture instance to the image acquisition means instance, if it is determined that the surface texture instance is generated, wherein the image acquisition means instance, by taking the surface texture instance as a call parameter, realizes the binding with the surface texture instance.

8. The image data distribution method according to claim 1, wherein the image acquisition means comprises: a camera; and the image data comprises: video streaming data.

9. An image data distribution apparatus applied to a terminal, comprising:

a processor; and a memory coupled to the processor, storing program instructions which, when executed by the processor, cause the processor to:

generate a surface texture instance for processing information acquired by an image acquisition means;

generate an image acquisition means instance corresponding to the image acquisition means;

bind the image acquisition means instance with the surface texture instance;

generate image data, by the surface texture instance processing the information acquired by the image acquisition means; and acquire the image data in an interface callback manner by using the image acquisition means instance, and distribute the image data to at least one of an application and a page instance;

wherein the acquiring the image data in an interface callback manner by using the image acquisition means instance comprises:

creating an image acquisition callback interface in the image acquisition means instance, wherein the image acquisition callback interface is used for realizing callback transmission of the image data and providing an image data transmission method;

providing the image acquisition callback interface to the surface texture instance; and receiving the image data sent by the surface texture instance by performing callback on the image data transmission method, by using the image acquisition means instance.

10. A terminal, comprising:

the image data distribution apparatus according to claim 9.

11. The image data distribution apparatus of claim 9, wherein the distributing the image data to at least one of an application and a page instance comprises:

judging whether an image data distribution interface of at least one of the application and the page instance is registered in the image acquisition means instance, wherein the image data distribution interface is used for realizing callback distribution of the image data and providing an image distribution method; and distributing the image data to at least one of the corresponding application and the page instance, by the image acquisition means instance performing callback on the image distribution method, if the image data distribution interface of at least one of the application and the page instance is registered in the image acquisition means instance.

12. The image data distribution apparatus of claim 9, wherein the generating a surface texture instance for processing information acquired by an image acquisition means comprises:

creating a texture instance by using OpenGL ES; and generating the surface texture instance by using the texture instance.

13. The image data distribution apparatus of claim 9, wherein the generating an image acquisition means instance corresponding to the image acquisition means comprises:

judging whether the image acquisition means is started; and generating the image acquisition means instance, if it is determined that the image acquisition means is started.

14. The image data distribution apparatus of claim 9, wherein the binding the image acquisition means instance with the surface texture instance comprises:

judging whether the surface texture instance is generated;

providing the surface texture instance to the image acquisition means instance, if it is determined that the surface texture instance is generated, wherein the image acquisition means instance, by taking the surface texture instance as a call parameter, realizes the binding with the surface texture instance.

15. A non-transitory computer-readable storage medium having thereon stored computer instructions which, when executed by one or more processors, cause the one or more processors to:

generate a surface texture instance for processing information acquired by an image acquisition means;

generate an image acquisition means instance corresponding to the image acquisition means;

bind the image acquisition means instance with the surface texture instance;

generate image data, by the surface texture instance processing the information acquired by the image acquisition means; and acquire the image data in an interface callback manner by using the image acquisition means instance, and distribute the image data to at least one of an application and a page instance;

wherein the acquiring the image data in an interface callback manner by using the image acquisition means instance comprises:

creating an image acquisition callback interface in the image acquisition means instance, wherein the image acquisition callback interface is used for realizing callback transmission of the image data and providing an image data transmission method;

providing the image acquisition callback interface to the surface texture instance; and receiving the image data sent by the surface texture instance by performing callback on the image data transmission method, by using the image acquisition means instance.

16. The non-transitory computer readable storage medium of claim 15, wherein the distributing the image data to at least one of an application and a page instance comprises:

judging whether an image data distribution interface of at least one of the application and the page instance is registered in the image acquisition means instance, wherein the image data distribution interface is used for realizing callback distribution of the image data and providing an image distribution method; and distributing the image data to at least one of the corresponding application and the page instance, by the image acquisition means instance performing callback on the image distribution method, if the image data distribution interface of at least one of the application and the page instance is registered in the image acquisition means instance.

17. The non-transitory computer readable storage medium of claim 15, wherein the generating a surface texture instance for processing information acquired by an image acquisition means comprises:

creating a texture instance by using OpenGL ES; and generating the surface texture instance by using the texture instance.

\* \* \* \* \*